United States Patent
Myara et al.

(10) Patent No.: US 10,621,586 B2
(45) Date of Patent: Apr. 14, 2020

(54) FRAUD PREDICTION BASED ON PARTIAL USAGE DATA

(71) Applicant: PAYPAL, INC., San Jose, CA (US)

(72) Inventors: Benjamin Hillel Myara, Tel Aviv (IL); David Tolpin, Ashdod (IL)

(73) Assignee: PAYPAL, INC., San Jose, CA (US)

( * ) Notice: Subject to any disclaimer, the term of this patent is extended or adjusted under 35 U.S.C. 154(b) by 563 days.

(21) Appl. No.: 15/420,613

(22) Filed: Jan. 31, 2017

(65) Prior Publication Data

US 2018/0218261 A1   Aug. 2, 2018

(51) Int. Cl.
| | |
|---|---|
| *G06Q 20/40* | (2012.01) |
| *H04W 12/12* | (2009.01) |
| *H04L 29/06* | (2006.01) |
| *G06Q 20/00* | (2012.01) |
| *G06N 3/08* | (2006.01) |
| *G06N 3/04* | (2006.01) |
| *H04W 12/00* | (2009.01) |

(52) U.S. Cl.
CPC ....... *G06Q 20/4016* (2013.01); *G06N 3/0445* (2013.01); *G06N 3/0454* (2013.01); *G06N 3/084* (2013.01); *G06Q 20/00* (2013.01); *H04L 63/1441* (2013.01); *H04W 12/12* (2013.01); *H04W 12/00505* (2019.01); *H04W 12/00508* (2019.01)

(58) Field of Classification Search
CPC .. G06Q 20/00; G06Q 20/401; G06Q 20/4016; G06N 3/0445; G06N 3/0454; G06N 3/084; H04L 63/1441; H04L 12/12; H04L 12/00505; H04L 12/00508
USPC .............................................. 706/21, 20, 25
See application file for complete search history.

(56) References Cited

U.S. PATENT DOCUMENTS

| | | | |
|---|---|---|---|
| 2011/0022483 A1* | 1/2011 | Hammad | G06Q 20/12 705/17 |
| 2016/0260100 A1* | 9/2016 | Wiesman | G06Q 20/4016 |
| 2017/0193400 A1* | 7/2017 | Bhaskar | G06F 17/5009 |
| 2017/0193542 A1* | 7/2017 | Rapaka | G06F 16/24578 |
| 2017/0358293 A1* | 12/2017 | Chua | G10L 13/08 |
| 2018/0247200 A1* | 8/2018 | Rolfe | G06N 3/0454 |

OTHER PUBLICATIONS

Marich et al., A Novel Approach for Automatic Acoustic Novelty Detection Using a Denoising Autoencoder With Bidirectional LSTM Neural Networks, 2015, IEEE, ICASSP 2015, pp. 1996-2000. (Year: 2015).*

* cited by examiner

*Primary Examiner* — Shane D Woolwine
(74) *Attorney, Agent, or Firm* — Haynes and Boone, LLP (57) ABSTRACT

A system for predicting that a user session will be fraudulent. The system can analyze an incomplete session and determine the likelihood that the session is fraudulent or not by generating completed sessions based on the incomplete session.

20 Claims, 7 Drawing Sheets

FRAUD PREDICTION BASED ON PARTIAL USAGE DATA

TECHNICAL FIELD

The present disclosure relates to fraud detection, and more specifically fraud detection based on interaction information.

BACKGROUND

Identity theft and fraudulent activities are major problems with internet service providers. Billions of dollars are lost due to fraud. Furthermore, as nefarious entities become more sophisticated, counter measures for fraud also need to become more sophisticated. Applicants recognize that there is a need for a more robust fraud detection system and also a fraud detection system capable of detecting the potential for fraud before completion of a fraudulent action.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, one skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

Some embodiments of the present disclosure include a system and method for detecting fraud. Some embodiments of the present disclosure include a system and method for detecting fraudulent actions or tasks prior to the completion of a fraudulent action or session is disclosed. In some examples, there may be multiple actions per session. In some examples, a sessions may include only a single action. In some embodiments, a fraudulent action may be an action on an online user account by an unauthorized user. A specific example of a fraudulent action or session may include, but is not limited to, an unauthorized user using one or more services of an online account. An example service may include, but is not limited to, making a payment, transferring money, purchasing an item, obtaining/viewing/listening to digital media, sending messages/emails, and/or the like. As discussed above, multiple tasks may be implemented during a session. For example, a user session for a merchant website may include the tasks of logging in, purchasing a first item, purchasing a second item, and transferring money to another account.

The system and method for detecting fraudulent actions or sessions may be based on analyzing a sequence of interactions from the user that form a completed session or action. For example, a sequence of interactions may come from a user interacting with a user interface. A non-exhaustive list of interaction information may include clicking on a first button, clicking on a second button, keystrokes on a keyboard resulting in entering in information (e.g. login information, user information, location information, search requests, etc.), mouse pointer movements, and/or the like. Interaction information may also include IP address, time stamps, duration on a particular page of a website or application flow, type of browser used, type of operating system used on the user system, and/or the like.

The system and method may use interaction information to predict whether the user is fraudulent and/or whether a fraudulent session or action is going to occur or is occurring. The system and method may receive as inputs one or more interactions that are part of a session or action and then determine the likelihood that the received inputs will amount to an eventual fraudulent action or session.

In some examples, the system and method may receive partial session data, such as clicks of buttons in addition to more session data. The partial session data may be data coming from a user and may be a part of a sequence of interactions that will eventually amount to an action or use of a service, such as a purchase of an item or transfer of money. The system and method may generate, based on the partial session data, which may be the initial interactions for a user intended action, a sequence of interactions that may complete the partial session data to a completed session with one or more associated actions. This may include completing one or more actions. Since there may be many ways to complete the partial session, the system may generate multiple completed sessions. In some examples, the system may generate all the possible ways a partial session may be completed. In some examples, the system may generate a predetermined number of ways the partial session may be completed, the predetermined number may be preset and/or dependent on factors such as time and/or a number or percentage of duplicate completed sessions that are generated.

With the computer generated completed sessions that the system and method generates, the system and method may, on each of the completed sessions, classify whether such a completed session is fraudulent or safe (not fraudulent). The system may then compare the number of fraudulent classified sessions there are from all the generated sessions with respect to the total number of sessions generated to determine a probability that a particular session may be fraudulent. The number of generated sessions may be a threshold predetermined number, or a number that can be completed in a predetermined amount of time. The number of generated sessions may be determined based on how many identical sessions are being generated. In some examples the system and method may simply divide the number of fraudulently (or safe) classified sessions by the total number of generated session. This would amount to an approximation of the likelihood of a fraudulent action resulting from sessions that started with the interactions of the partial session.

In some examples, the system and method may use a trained neural network for generating completed sessions. In some examples, that generator may be built using Recurrent neural networks (RNNs). A non-exhaustive list of specific RNNs that the system and method may use may include Long Short Term Memory networks (LSTMs), Bidirectional LSTMs, stacked LSTMs, and/or the like. One benefit of using LSTMs and/or Bidirectional LSTMs is the ability to have past or prior inputs/events affect present sessions of the neural networks. In relation to this system and method, LSTMs allow for using partial sequence of user interactions to predict possible future user interactions or how a session will complete based on partial information regarding a session.

In some examples, the trained neural network used for generating completed sessions may be trained in a generative adversarial network GAN. The generator may be pitted against a discriminator configured to classify between real sessions and computer generated sessions. The generator may be configured to generate sessions and input the sessions into the discriminator, and the discriminator may receive the sessions from the generator but also real sessions from users, which may be received from a database of sessions. The discriminator may be trained on the known generated and real sessions to classify between the two types of sessions. The discriminator may then feedback to the generator whether the generator was able to fool the discriminator (i.e. classify the generated session as real). The GAN may iterate until the discriminator is unable to distinguish the real sessions from generated sessions. In this manner, the generator would be capable of generating more realistic sessions.

Additionally, the system may have a discriminator trained to classify completed sessions as either fraudulent or not fraudulent/safe. The discriminator may be a classifier using one or more different classification techniques including but not limited to perception, regression, Bayes, nearest neighbor, ensembles, decision trees, and/or the like. In some examples, the discriminator may also be a deep neural network, such as an LSTM. The discriminator may be trained on known fraudulent and non-fraudulent completed sessions.

In some examples the system and method may input to the trained generator an incomplete session, which may be session information recently received as a user interacts with an internet service. The information received of the incomplete session may be input into the generator to generate multiple completed sessions based on the incomplete session. The generated completed sessions may be then input into the discriminator for classifying the completed sessions as fraudulent or safe/non-fraudulent. The system and method may then determine the ratio of fraudulent to safe classifications to determine the likelihood that an incomplete session is fraudulent. The system and method predicts how the path to a complete session is likely to occur based on the initial incomplete session information received. If many or most of the path lead to a fraudulent classification, the system and method can determine that the incomplete session is a result of a fraudulent actor.

In some examples, the system and method may have the generator emulate the user when generating the completed session. In this manner, the system may predict fraudulent actions also based on the unique way a user completes sessions. In some examples, the system may use a variational autoencoder (VAE) to generate sessions or completed session similar to sessions of a particular user. In some examples, the VAE may be the trained generator discussed above as the decoder for reconstructing completed sessions. The VAE may also implement an encoder. The encoder may receive, as input, a complete session which the encoder may encode or compress the information from the complete session into a latent vector that can be input into the decoder. The encoder may be constrained to produce latent vectors with variables that are parameters of a Gaussian distribution. The variables of the latent vector may be parameters of a distribution, for example the variables may be $\mu_i$ and $\sigma_i$, which can be used in the equation $\mu_i + \sigma_i * \epsilon_i$ wherein $\mu_i$ is the mean, $\sigma_i$ is the standard deviation, and $\epsilon_i$ is a value sampled from a distribution, such as N(0,I). This allows for the system to create a vector that is sampled from a normal distribution (although other distribution may be used). The VAE may then be trained using back propagation and gradient descent to minimize a loss function, for example minimizing the reconstruct the reconstruction loss and regularization loss. The $\epsilon_i$ allows for the system sample vectors from a desired probability distribution. Although the above example uses a Gaussian distribution, other distributions may be used, such as a Gamma distribution, exponential distribution, etc.

Furthermore, the VAE may be trained to output vectors from the same user to be similar. This may be done using a Siamese network. The Siamese network may be two identical neural networks that accepts two inputs and then trained to minimize hinge loss. For example, the Siamese network may accept two sessions with known users as inputs, one for each neural network, and optimize the hinge loss equation $Ln = \|S1-S2\|$ if session S1 is from the same user as session S2, otherwise $Ln = \max(0, 1-\|S1-S2\|)$ (i.e. when the users are different). The Siamese network can then be used to determine whether two sessions are from the same user. The Siamese network can be used to train the VAE such that the VAE will create outputs that would when put into the Siamese network with the input, the Siamese network would output that the both are from the same user. In this manner the VAE generates sessions that are similar or have characteristics of the user used as the input.

In some examples, the order in which the training occurs may start with the generator, then train the Siamese network, and finally the encoder part of the VAE.

The VAE can now generate a completed session from a partial session. A session (either a historic sessions from the same user or a random user) can be used as the input to the encoder portion of the VAE and the generator can generate a sessions using the resultant latent vector from the encoder and the known initial parts of the session from the partial session as inputs.

The system and method may then generate several sessions and use a discriminator to classify the sessions as fraudulent or not. The ratio of fraudulent or not classifications of the generated sessions may be used to predict the likelihood that the partial session will end in a fraudulent session.

Figure 1:
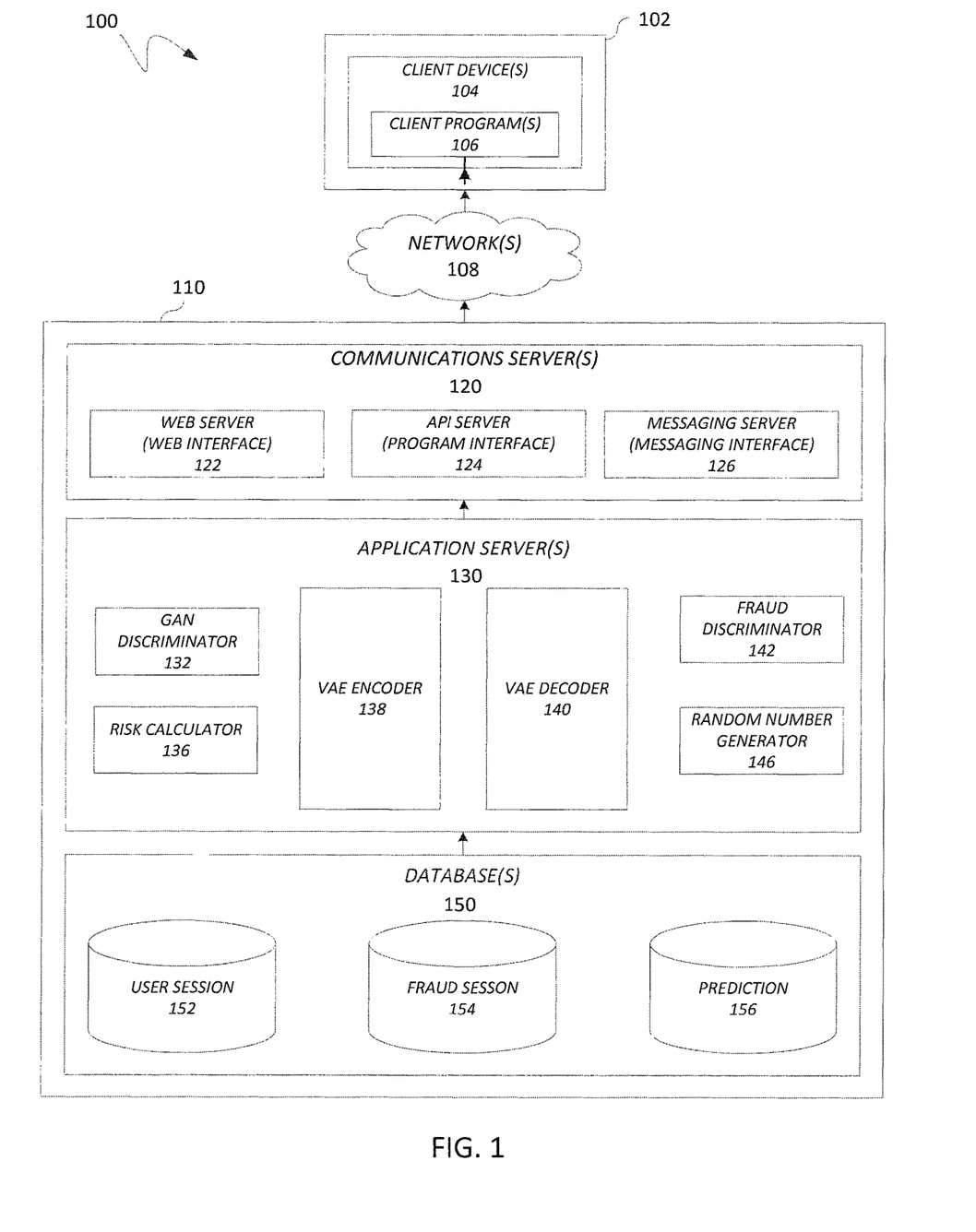
FIG. 1 is a block diagram of an example computing system for fraud prediction.

FIG. 1 illustrates, in block diagram format, an example embodiment of a computing system adapted for implementing one or more embodiments disclosed herein to predict fraud. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110 and one or more 3rd part devices (not shown). Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various services to client devices and/or 3rd party devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be a server that provides various services to client devices, such as malware detection and/or malware library updates. Application servers 130 may include multiple servers and/or components. For example, application servers 130 may include a discriminator 132 used for a GAN, risk calculator 136, encoder 138 that may be part of a VAE, decoder 140 that may be part of a VAE, discriminator 142 for classifying actions as fraudulent, and/or random number generator 146. These servers and/or components, which may be in addition to other servers, may be structured and arranged to help detect fraud.

Application servers 130, in turn, may be coupled to and capable of accessing one or more databases 150 user session database 152, fraud session database 154, and/or predictions database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
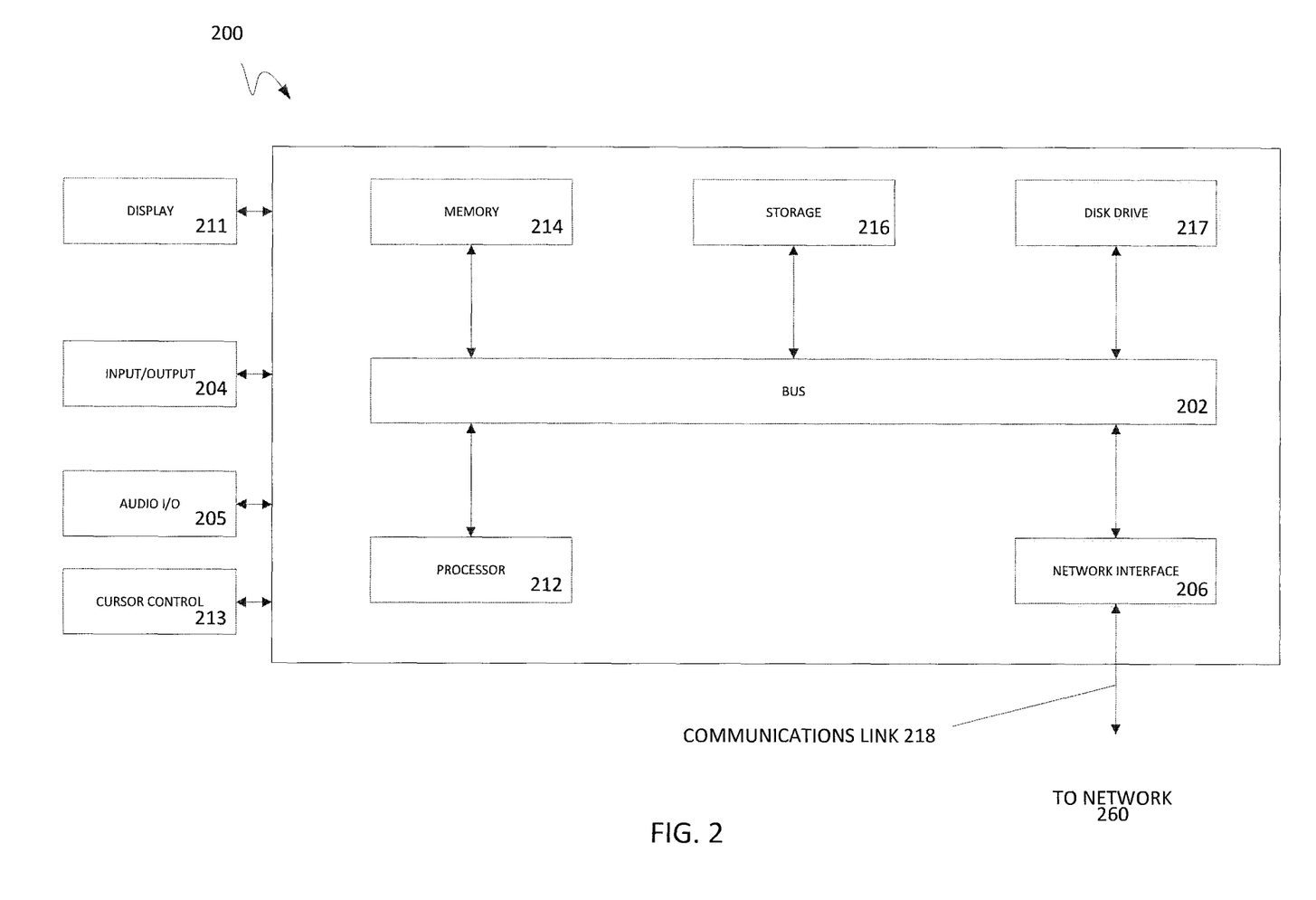
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal-oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many foul's, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
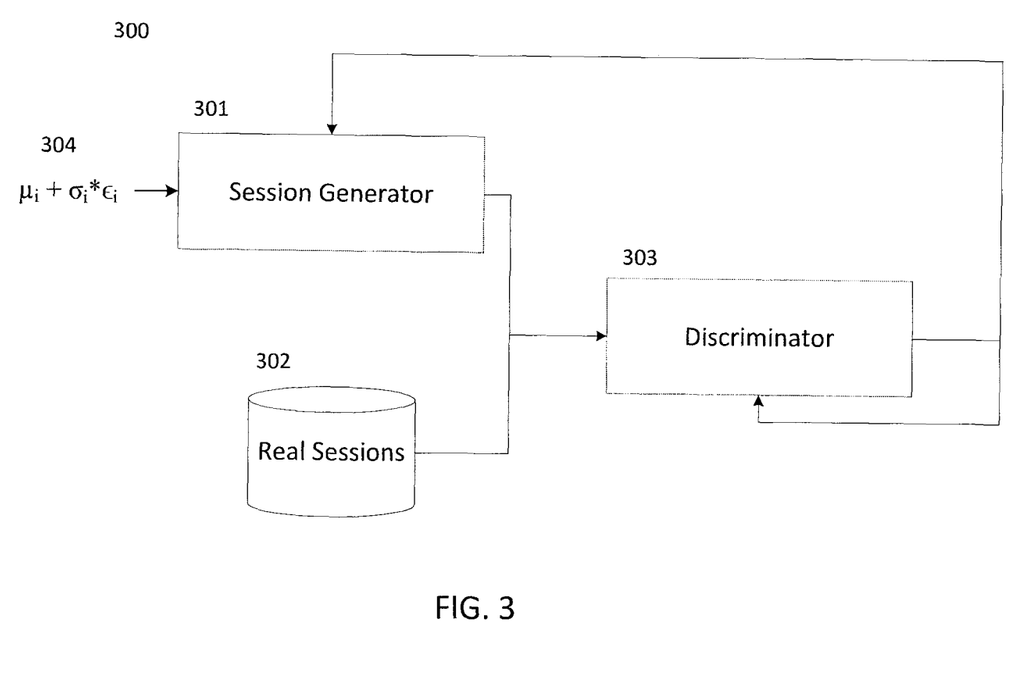
FIG. 3 is a block diagram of an example generative adversarial network configured for training a session generator.

FIG. 3 is a block diagram of an example GAN 300 set up to train a session generator 301 to generate realistic user sessions. GAN 300 may include a session generation 301, which may be a neural network being trained to generate realistic sessions and a discriminator 302, which may be a neural network, Bayesian classifier, nears neighbor classifier, support vector machine, and/or other classifier trained to classify inputs as real or machine generated.

Session generator 301 may be configured to receive a latent vector 304, which may be a hyperparameter, and/or random input and generate a session as output. Session generator 301 may feed the output to discriminator 302 for a determination of whether discriminator 302 classified the generated session as real or fraudulent/generated. The classification result may be fed back to session generator 301 to train session generator 301 to generate better or more realistic sessions (i.e. through back propagation).

Discriminator 303 may receive session inputs from session generator 301, as discussed above, and real sessions database 302. Real sessions database 302 my store recorded sessions of users using an online service. Discriminator may attempt to classify each input as either generated or real. The result as to whether discriminator 303 correctly classified the session as real or generated may be used as feedback to train the discriminator to better classify future inputs. GAN 300 may be run through several iterations and/or epochs until discriminator 303 cannot tell the difference between session generated by session generator 301 and the real sessions from real sessions database 302 or session generation 301 is able to fool the discriminator over a threshold percentage of generated sessions. In some examples, GAN 300 may also (or in contrast) be configured to run a threshold number of iterations and/or epochs. In this manner, an administrator can ensure that session generator 301 is properly trained.

Figure 4:
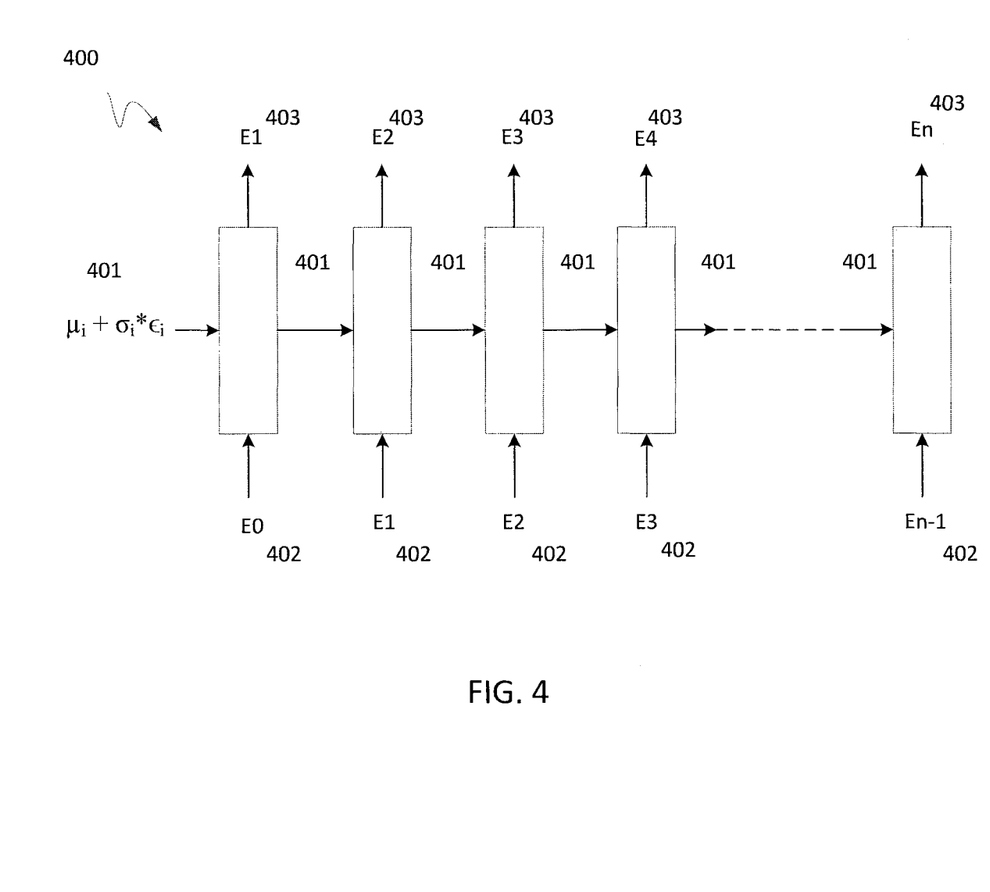
FIG. 4 illustrates an example of session generator in block diagram format.

FIG. 4 illustrates an example of session generator 400. In this example, sessions generator 400 is an LSTM neural network. In some examples, session generator 301 may use session generator 400. In some embodiments, session generator 400 may be configured to receive latent variable input 401. Furthermore, generator 400 may be configured to receive prior interaction 402. In some examples, when there is no prior interaction, prior interaction 402 may be zeros or a predetermined beginning of sentence vector. Generator 400 may generate and predict next interaction 403 based on latent variable 401 and prior interaction 402. In some examples, Generator may change or transform latent variable 401, as is done in an LSTM when preserving prior information, when used to generate the next interaction 403. Generator 400 may then use next interaction 403 as prior input and latent variable 401 to predict the next interaction until a complete session has been generated. As configured, generator 400 can either completely generate a session or receive partial sessions (which may be separated into interactions) and generate a complete session based on the partial session by inputting the partial session as one or more of the prior interactions. For example, inputs E0-E3 may be from the partial session.

Figure 5:
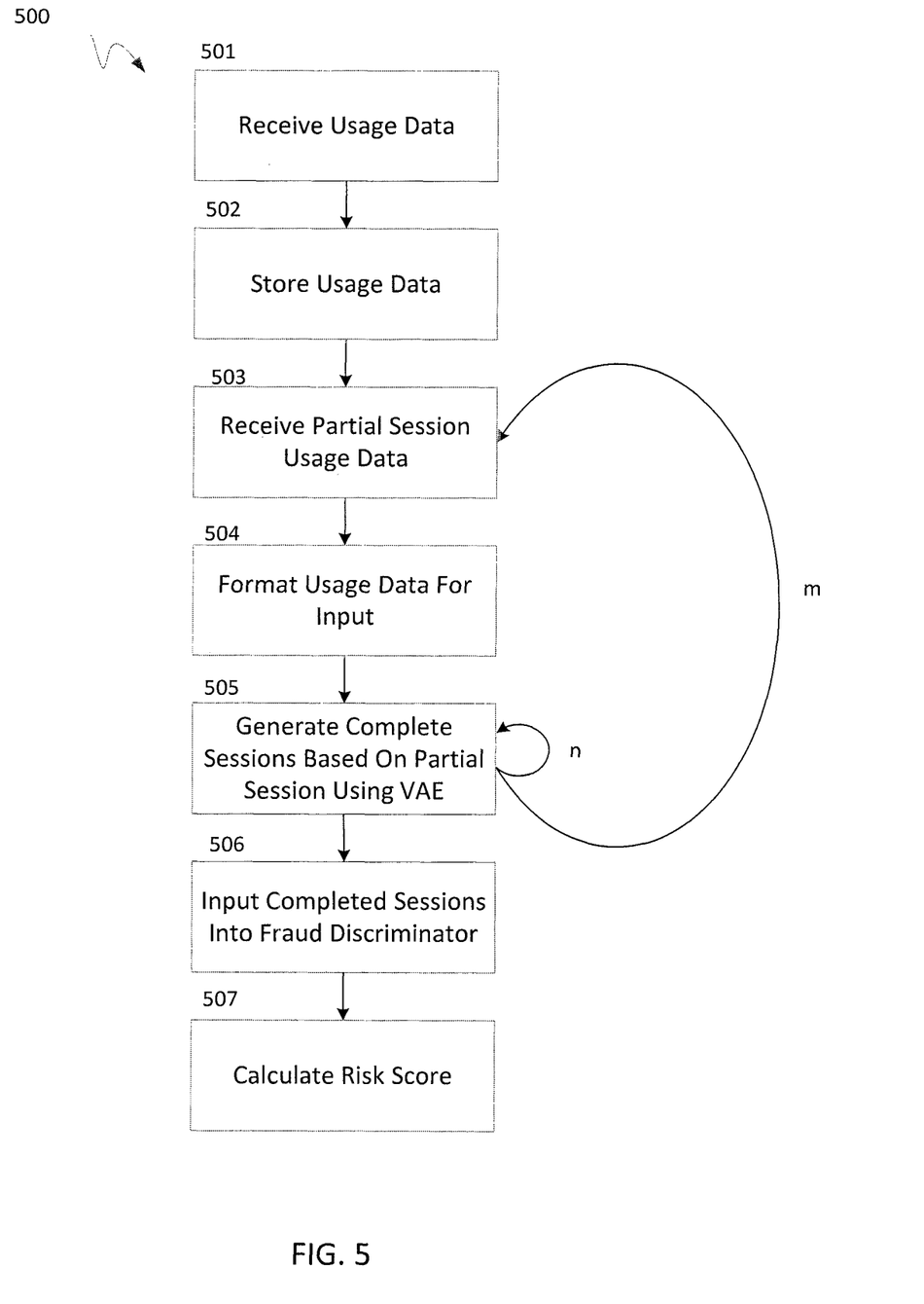
FIG. 5 is a flow diagram illustrating an example process for determining the likelihood of a fraudulent actor.

FIG. 5 illustrates a process 500 for determining the likelihood of a fraudulent actor. In some examples, process 500 may be used to determine the likelihood of a fraudulent actor in real time before completion of a session, task, and/or action. For simplification, this application discusses embodiments and examples in terms of sessions, but it is expected that the embodiments will also apply to tasks and actions. A real time session, for the purposes of this application is a session that is live or in progress. Similarly, a real time task or action would be a task or action that is live or in progress.

A session may have completed actions and/or tasks but still be live or in progress. Process 500 may include operation 501 wherein the system implementing process 500 receives usage data such as device information, user information, inputs, actions and/or the like. Usage data may include information such as indicators of the type of device a user is using, the operating system on the user device, type of browser, IP address, browsing information, session time, mouse clicks, mouse movements, text entered using a keyboard, actuation of virtual buttons, time stamps related to user inputs and interactions, and/or the like. Some of this usage data may be received from a third party, such as a website or server for a merchant. Some of this usage data may be received from a web server handled or controlled by the system. The usage data may be part of a sequence that amounts to a complete user session. A complete user session may be delineated by certain milestones or triggers for example, the start of a session may be from the first connection to certain pages or parts of a flow for a website or an application, receipt of a login credential, start of a transaction, an actuation of a button or link, and/or the like. An end of a session may also be delineated by certain pages or parts of a flow for a website or an application (e.g. confirmation page), completion of a transaction, actuation of a button or link, completion of a task or action, and/or the like. The presence of a trigger for starting a session without or lack of a trigger delineating the end of a session may indicate that the session is incomplete. The usage data may be received from many different users from many different sessions.

Process 500 may include operation 502. At operation 502, the system may store the received user data and store it in a database. In some examples, the collected user data may be stored together for a completed session in a database for maintaining historic user usage data. The data may also be associated with other information determined by the system, one or more third party systems, or a combination thereof. For example, transactions may be declined or found to be fraudulent at a later time. Furthermore, the data may be categorized or structured in such a way that the data can be organized or structured in a manner such that the sessions can be grouped or identified based on account information (e.g. user name, real name, phone number, an assigned session ID, and/or the like).

At operation 503, the system may receive usage data from a user or an account. The usage data from the user may be associated with a triggered ongoing and/or incomplete session. In some examples the usage data received at operation 503 may be received in real time, near real time, and/or streamed as the session occurs. An example complete session for an online purchase may start with logging into an account, moving a mouse and clicking buttons for browsing and selecting an item for purchase, moving a mouse to click a purchase button, and clicking the purchase button. An example partial or incomplete session may be the usage data up until the middle portion of the example completed session. As such, more and more usage data may be added to the partial session as the session continues to be conducted by the user. For example, the user may still be browsing items for purchase and has not reached the point of clicking on the purchase button. The purchase session example is provided only as an example of one type of session. This process is compatible with other types of sessions (such as peer-to-peer transactions) and are contemplated herein.

Process 500 may include operation 504 wherein the system may format the usage data of completed sessions and partial usage data for input into a neural network, such as a VAE. For example some of the data may be placed in an array. Some data may be represented in an indicator vector or one-hot encoding. For example, if there were 3 possible buttons to press, pressing button 1 may be represented as [1, 0, 0]; pressing button 2 may be represented as [0, 1, 0]; and pressing button 3 may be represented as [0, 0, 1]. This may also apply to information such as the type of browser, operating system, device type, etc. Continuous or real numbered data points such as time stamps may be normalized and held as real numbers. Data that provides discrete values, such as locations, IP addresses, and/or the like, may be converted to vectors in a lower dimensional space that preserves information. The resultant data may be placed in a large array for using as an input.

At operation 505, the system may select a completed session stored in the database in operation 502 and the usage data for the partial session at operation 503 that is for flatted through operation 504 and input the formatted data into a VAE configured to create or generate usage data (which may be referred to as computer generated usage data) that completes the partial session based on the inputs. The generated usage data combined by the received usage data may form a completed session, which is partially computer generated. In some examples, the completed session selected from the database may be chosen at random. In some examples, the completed session selected from the database may be selected at random. In some examples the completed session may be selected randomly from a subset of completed sessions such as completed sessions associated with a geographical location, session time frame (e.g. a time frame of when the session was started), and/or the like. In some examples, the subset of completed sessions that the system selects from may be completed sessions associated with the user, which may be identified based on user name, account number, and/or other identifying information. In some examples, the subset may be based on multiple categories, such as session start time frame and user name.

In some examples operation 505 may be looped multiple times to generate several completed sessions based on the partial session. In some examples, the number of loops may be predetermined. In some examples, the number of loops may be dependent on whether the risk score is changing within a threshold number of loops (for example, whether the risk score meaningfully changes (such as a predetermined threshold amount) ever X number of loops (X may be predetermined), dependent on time, and/or other factors discussed herein. The loop may be just operation 505, from operation 503, or a combination thereof. Each loop may randomly select another completed partial session for use as an input. Furthermore, the incomplete or partial session may be updated as more usage data is received for the partial session between loops at operation 503. Furthermore, in some examples, the subset of completed sessions that the system selects from as input to the VAE may change depending on the loop. For example, a percentage of the loops may select completed sessions from a first subset and the rest from another subset. In some examples, the loops may select sessions from more than two subsets. In some examples, the system may be configured such that a percentage of the loops use a random session from the entire set of completed sessions and another percentage of the loops use a random session from a subset of completed sessions by the user. In some examples, the percentage selection from the entire set or subset may depend on a percent of fraudulent actions that occur with the system. For example, the system may on average have 2% fraudulent actions among all actions. As such, to simulate and integrate that average fraud amount into the risk score calculator, the system may have 98% of the loops use a session chosen from a subset of database sessions associated with the user along with 2% randomly from the rest of the database or the entire set of sessions. This way, the session selected from the entire set of session could simulate fraudulent actions because the VAE will generally generate complete sessions with signatures of or similarities to the session input.

At operation 506, the system may input the generated sessions from operation 505 into a discriminator to classify the generated sessions as either fraudulent or not. The discriminator may be a classifier trained classify a session as fraudulent or not. The classifier may be trained from a database of historic known fraudulent and non-fraudulent sessions held in a database, such as the sessions stored in operation 502. In some examples, the classifier may use the formatted forms of the session data to conduct the classification.

In some examples, the classifier may be trained to provide a probability that a session is fraudulent based on whether the session has a similar projection or latent representation as historic sessions associated with the user.

At operation 507, the system may calculate the risk score based on the number fraudulent to non-fraudulent classifications of the generated session at operation 506. In some example the risk score may be based on the percentage of fraudulent or non-fraudulent categorized generated sessions. Based on the risk score the system may implement one or more security or convenience measures. For example, if the risk turns out to be low, the system may increase preauthorization values or preauthorize for certain transactions. On the other hand, if the risk turns out to be high, the system may implement additional security measures, such as asking for a pin number, additional questions, or other authentication or security measures to ensure the user is an authorized user or prevent the fraud. In some examples, the system may log the user out or prevent the user from completing the session. In some examples, the system may lock the account.

Figure 6:
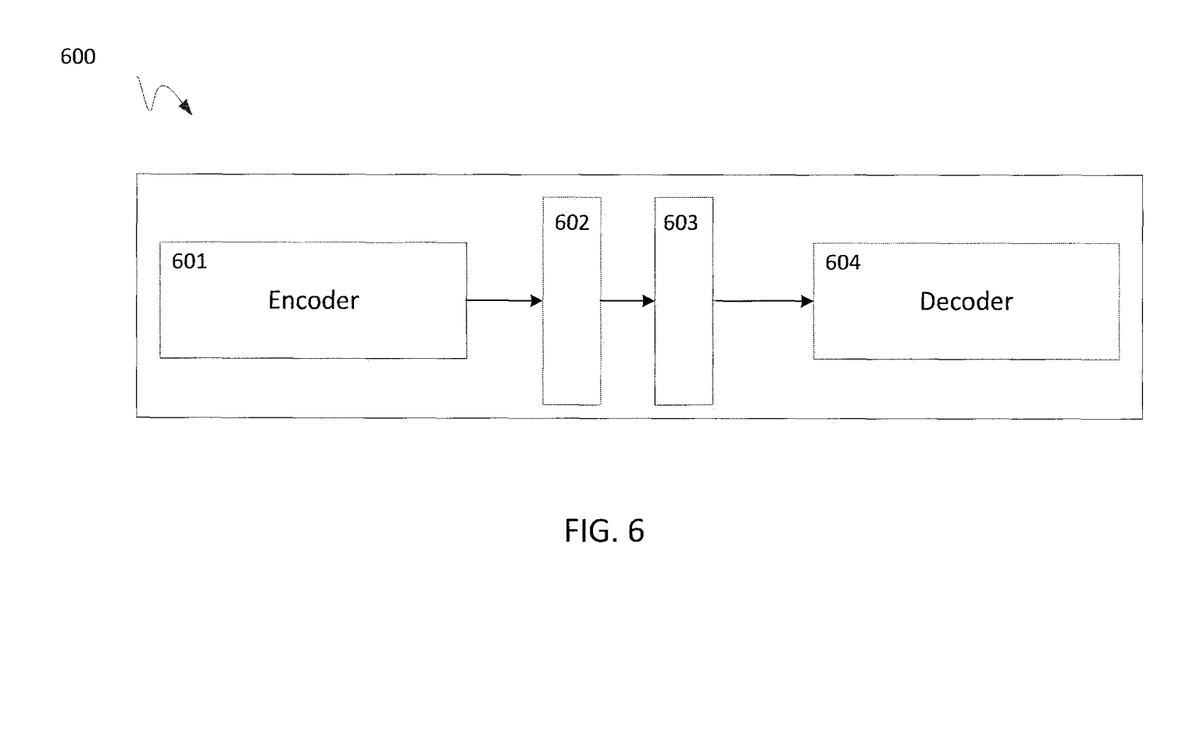
FIG. 6 illustrates an example variational autoencoder that may be used in the process of FIG. 5.

FIG. 6 illustrates an example VAE 600. In some examples, VAE 600 may be used as the VAE for operation 505 of FIG. 5. As illustrated, VAE 600 has been separated into four parts, the encoder 601, latent vector 602, sampler 604, and the decoder 604. In some examples, decoder 604 may be the trained session generator 301 of FIG. 3. VAE 600 may be trained such that VAE 600 will generate a completed session based on a completed session being input into VAE 600.

Encoder 601 may be a neural network configured to receive formatted usage data for a completed session as an input, and output a latent vector 602. The encoder may be configured such that the output is a vector of means and standard deviations for a distribution, such as a Gaussian distribution. The VAE may have a sampler 603 to sample each variable from the distribution with the provided mean and standard deviation from the latent vector 602 as input into the decoder. For example, the variables of the latent vector 602 may be represented by $\mu_i$ and $\sigma_i$ wherein $\mu_i$ are the means of the vector outputted by the encoder, $\sigma_i$ are the standard deviations of the vector outputted by the encoder. The sampler 603 may provide an error or noise $\epsilon_i$ sampled from a unit Gaussian N(0,I) so that the input to the decoder is sampled from a Gaussian distribution based on the mean and standard deviations outputted by the encoder, which may be calculated by $\mu_i + \sigma_i * \epsilon_i$. In this manner, even if the same input is provided to the encoder, the input to the decoder will not necessarily be the same because the input to the decoder is sampled from a distribution that is defined by the encoder. VAE 600 may be trained by inputting complete sessions and updating the VAE to optimize generation loss, which may be determined by the mean squared error between the output (e.g. generated session by the VAE) and the input, (e.g. complete session used as input), and how close the latent variable matches the distribution (e.g. the unit Gaussian distribution), which may be determined by the Kullback-Leibler divergence (also known as KL divergence) of the latent variable from the distribution.

Furthermore, VAE 600 may be trained to produce outputs that would be similar to a session from a user whose session is used as the input. In this manner, generated sessions using the VAE will maintain characteristics/styles/signatures of the inputted session.

Figure 7:
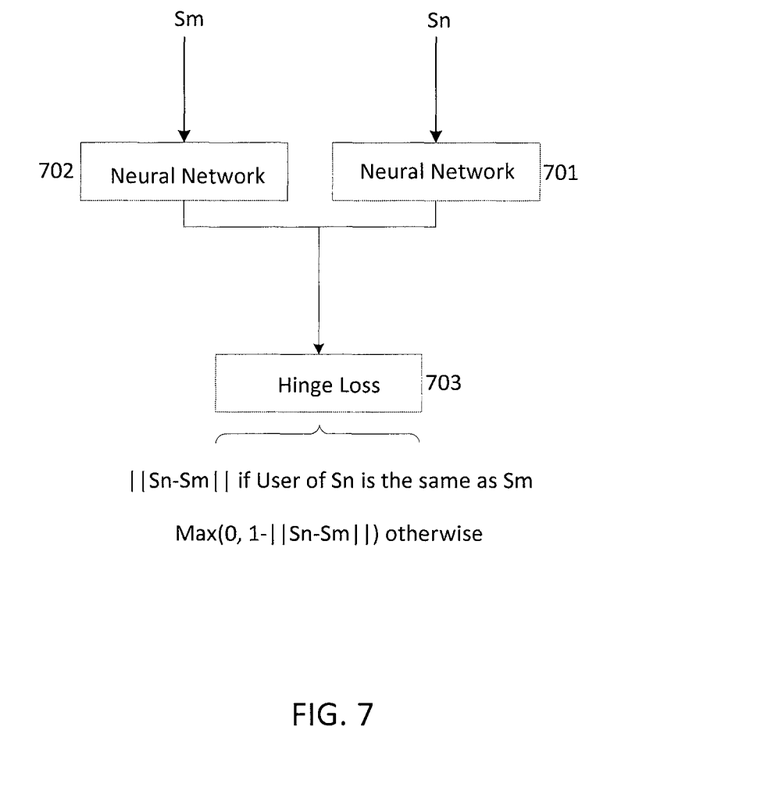
FIG. 7 illustrates an example Siamese network for determining the similarity of two inputs.

FIG. 7 illustrates an example Siamese network for training a VAE to generate sessions that mimics the user of the input session. As shown, training the Siamese may comprise inputting a complete sessions Sn into neural network 701 and Sm into neural network 702 from a database of completed sessions. Neural network 701 and 702 are copies of the same neural network while Sn and Sm are different inputs. The hinge loss module 703 may take the outputs of neural networks 701 and 702 and determined the distance between the outputs and then optimize neural networks 701 and 702 to minimize hinge loss based on the distance. For example module 703 may optimize neural networks 701 and 702 (which are the same encoders) for the following hinge loss ‖Sn−Sm‖ when the completed session Sn is from the same user as Sm and max(0, 1−‖Sn−Sm‖) when the completed session Sn is not from the same user as Sm. Determining whether Sn and Sm are from the same user may be based on one or more usage data information, such as username, account identifier, device identifiers, IP addresses, mac addresses, location, and/or the like.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   one or more hardware processors coupled to the non-transitory memory and configured to execute the instructions from the non-transitory memory to cause the system to perform operations comprising:
   collecting usage data during an active session corresponding to an in-progress incomplete task of a user;
   selecting historic usage data corresponding to completed tasks from a database;
   formatting the usage data and the historic usage data in a format acceptable as an input into a neural network;
   inputting the formatted usage data and the formatted historic usage data to the neural network;
   generating, using the neural network, computer: generated usage data based on the usage data and the historic usage data;
   based on the computer-generated usage data, predicting, using the neural network, a remaining portion of the in-progress incomplete task of the user to create a complete task that is partially computer-generated;
   determining a probability that a task by the user from the in-progress incomplete task will be fraudulent based at least in part on the complete task that is partially computer-generated; and
   implementing an additional security measure based on the probability exceeding a threshold value.

2. The system of claim 1, wherein the neural network comprises a variational autoencoder (VAE), the VAE configured to predict the remaining portion of the in-progress incomplete task.

3. The system of claim 2, wherein the VAE comprises a decoder that is a long short term memory neural network configured to receive formatted usage data.

4. The system of claim 3, wherein the decoder was trained in a generative adversarial network (GAN) having a discriminator configured to discriminate between outputs from the decoder and the historic usage data corresponding to completed tasks from the database.

5. The system of claim 1, wherein the determining the probability comprises classifying the complete task that is partially computer-generated as fraudulent or not fraudulent.

6. The system of claim 1, wherein the operations further comprise:
   predicting different remaining portions of the in-progress incomplete task to create a plurality of complete tasks, each of the complete tasks corresponding to a different remaining portion; and
   classifying the plurality of complete tasks, wherein the determining the probability is further based on the classifying the plurality of complete tasks.

7. The system of claim 1, wherein the selecting the historic usage data corresponding to the completed tasks from the database is selected at random.

8. The system of claim 7, wherein the selecting the historic usage data corresponding to the completed tasks from the database is selected at random from a subset of the database, and wherein the subset of the database is associated with the user.

9. The system of claim 6 wherein at least a first part of the plurality of complete tasks are based on the historic usage data for completed tasks associated with the user and at least a second part of the plurality of complete tasks are based on historic usage data for completed tasks associated with other users.

10. The system of claim 9 wherein a ratio between the first part and second part depends at least in part on a fraud percentage.

11. A non-transitory machine-readable medium having stored thereon machine-readable instructions executable to cause a machine to perform operations comprising:
   receiving usage data for an incomplete purchase interaction of a user;
   selecting historic usage data from a database, the historic usage data corresponding to completed purchase interactions;
   generating, using a neural network, computer-generated usage data based on an input comprising the usage data and the historic usage data;
   based on the computer-generated usage data, predicting, using the neural network, a remaining portion of the incomplete purchase interaction to create a complete purchase interaction that is partially computer-generated;
   determining a probability that a completed purchase interaction by the user from the incomplete purchase interaction will be fraudulent based at least in part on the complete purchase interaction that is partially computer: generated; and implementing an additional security measure based on the probability exceeding a threshold value.

12. The non-transitory machine-readable medium of claim 11, wherein the neural network comprises a variational autoencoder (VAE), wherein the VAE is configured to predict the remaining portion of the incomplete purchase interaction.

13. The non-transitory machine-readable medium of claim 12, wherein the VAE comprises a decoder that was trained in a generative adversarial network (GAN) having a discriminator configured to discriminate between outputs from the decoder and the historic usage data from the database.

14. The non-transitory machine-readable medium of claim 11, wherein the selecting the historic usage data from the database is selected at random from a subset of the database, and wherein the subset is associated with the user.

15. A computer-implemented method comprising:
receiving usage data for an incomplete online session interaction of a user;
generating, using a neural network, computer-generated usage data based on an input comprising the usage data and historic completed usage data;
predicting, using the neural network, a remaining portion of the incomplete online session interaction of the user to create a complete online session interaction that is partially computer-generated;
determining a probability that a future, completed online session interaction by the user from the incomplete online session interaction will be fraudulent based at least in part on the complete online session interaction that is partially computer-generated; and
implementing an additional security measure based on the probability exceeding a threshold value.

16. The computer-implemented method of claim 15, wherein the additional security measure is an authentication request to allow the user to complete the incomplete online session interaction.

17. The computer-implemented method of claim 15, wherein the incomplete online session interaction is incomplete due to a lack of a user interaction indicating completion.

18. The computer-implemented method of claim 15, wherein generating computer-generated usage data comprises formatting the usage data in a format acceptable by the neural network.

19. The computer-implemented method of claim 18, wherein formatting the usage data comprises transforming at least a part of the usage data into a one-hot vector.

20. The computer-implemented method of claim 17, wherein the user interaction indicating completion is an actuation of a virtual button by the user.

* * * * *

UNITED STATES PATENT AND TRADEMARK OFFICE
CERTIFICATE OF CORRECTION

PATENT NO. : 10,621,586 B2  
APPLICATION NO. : 15/420613  
DATED : April 14, 2020  
INVENTOR(S) : Benjamin Hillel Myara and David Tolpin Page 1 of 1

It is certified that error appears in the above-identified patent and that said Letters Patent is hereby corrected as shown below:

In the Specification

In the Detailed Description:

In Column 7, Line 65, change "foul's" to "forms"

In Column 11, Line 18, change "for flatted" to "formatted"

In the Claims

In Column 13, Line 63, change ":" to "-"

In Column 15, Line 3, change ":" to "-"

Signed and Sealed this
Twenty-first Day of July, 2020

Andrei Iancu
*Director of the United States Patent and Trademark Office*